(12) United States Patent
Bowditch et al.

(10) Patent No.: US 11,588,834 B2
(45) Date of Patent: Feb. 21, 2023

(54) SYSTEMS AND METHODS FOR IDENTIFYING ATTACK PATTERNS OR SUSPICIOUS ACTIVITY IN CLIENT NETWORKS

(71) Applicant: SECUREWORKS CORP., Wilmington, DE (US)

(72) Inventors: William Parke Bowditch, Edinburgh (GB); Raul Garcia Calvo, Edinburgh (GB); John M. Nicholas, Fairfax, VA (US); Tomasz Sarota-Raczek, Naperville, IL (US); Radoslaw Gasiorek, Edinburgh (GB)

(73) Assignee: Secureworks Corp., Wilmington, DE (US)

( * ) Notice: Subject to any disclaimer, the term of this patent is extended or adjusted under 35 U.S.C. 154(b) by 252 days.

(21) Appl. No.: 17/011,225

(22) Filed: Sep. 3, 2020

(65) Prior Publication Data
US 2022/0070182 A1 Mar. 3, 2022

(51) Int. Cl.
*H04L 9/40* (2022.01)
*H04L 67/306* (2022.01)

(52) U.S. Cl.
CPC ........ *H04L 63/1416* (2013.01); *H04L 63/102* (2013.01); *H04L 63/1425* (2013.01); *H04L 67/306* (2013.01); *H04L 63/10* (2013.01)

(58) Field of Classification Search
CPC ............... H04L 63/1416; H04L 63/102; H04L 63/1425; H04L 67/306; H04L 63/10
USPC ........................................................ 726/22
See application file for complete search history.

(56) References Cited

U.S. PATENT DOCUMENTS

| 5,937,066 A | 8/1999 | Gennaro et al. |
| 6,357,010 B1 | 3/2002 | Viets et al. |
| 7,269,578 B2 | 9/2007 | Sweeney |
| 7,331,061 B1 | 2/2008 | Ramsey et al. |
| 7,492,957 B1 | 2/2009 | Bonhaus |

(Continued)

FOREIGN PATENT DOCUMENTS

| EP | 3599753 A1 | 1/2020 |
| RU | 2738344 C1 | 12/2020 |

(Continued)

OTHER PUBLICATIONS

Afroz, S. and Greenstadt, R. "PhishZoo: Detecting Phishing Websites by Looking at Them"; IEEE Fifth International Conference on Semantic Computing, 2011; pp. 368-375; doi: 10.1109/ICSC.2011.52; 2011.

(Continued)

*Primary Examiner* — Badri N Champakesan
(74) *Attorney, Agent, or Firm* — Womble Bond Dickinson (US) LLP

(57) ABSTRACT

Systems and methods for identifying attack patterns or suspicious activity can include a profile builder, a primitive creator, and a compromise detector. The profile builder can populate one or more baseline activity profiles for each client of the plurality of clients or entities associated therewith. The primitive creator can create primitives by comparing identified or extracted features to information in the one or more baseline activity profiles. The compromise detector can receive primitives, and based on identified combinations or sequences of primitives, generate compromise events to be provided to clients.

16 Claims, 6 Drawing Sheets

(56) References Cited

U.S. PATENT DOCUMENTS

| | | |
|---|---|---|
| 7,548,932 B2 | 6/2009 | Horvitz et al. |
| 7,555,482 B2 | 6/2009 | Korkus |
| 7,571,474 B2 | 8/2009 | Ross et al. |
| 7,594,270 B2 | 9/2009 | Church et al. |
| 7,606,801 B2 | 10/2009 | Faitelson et al. |
| 7,613,722 B2 | 11/2009 | Horvitz et al. |
| 7,770,031 B2 | 8/2010 | MacKay et al. |
| 7,856,411 B2 | 12/2010 | Darr |
| 7,926,113 B1 | 4/2011 | Gula et al. |
| 8,079,081 B1 | 12/2011 | Lavrik et al. |
| 8,122,495 B2 | 2/2012 | Ramsey et al. |
| 8,156,553 B1 | 4/2012 | Church et al. |
| 8,327,419 B1 | 12/2012 | Korablev et al. |
| 8,407,335 B1 | 3/2013 | Church et al. |
| 8,490,193 B2 | 7/2013 | Sarraute et al. |
| 8,490,196 B2 | 7/2013 | Lucangeli et al. |
| 8,522,350 B2 | 8/2013 | Davenport et al. |
| 8,539,575 B2 | 9/2013 | Schmitlin et al. |
| 8,578,393 B1 | 11/2013 | Fisher |
| 8,595,170 B2 | 11/2013 | Gladstone et al. |
| 8,621,618 B1 | 12/2013 | Ramsey et al. |
| 8,701,176 B2 | 4/2014 | Ramsey et al. |
| 8,793,786 B2 | 7/2014 | Bhesania et al. |
| 8,805,881 B2 | 8/2014 | Hom et al. |
| 8,832,048 B2 | 9/2014 | Lim |
| 8,839,414 B2 | 9/2014 | Mantle et al. |
| 8,898,777 B1 | 11/2014 | Oliver |
| 8,909,673 B2 | 12/2014 | Faitelson et al. |
| 8,931,095 B2 | 1/2015 | Ramsey et al. |
| 8,938,802 B2 | 1/2015 | Davenport et al. |
| 8,959,115 B2 | 2/2015 | Marathe |
| 8,984,644 B2 | 3/2015 | Oliphant et al. |
| 9,009,828 B1 | 4/2015 | Ramsey et al. |
| 9,032,478 B2 | 5/2015 | Ballesteros et al. |
| 8,928,476 B2 | 6/2015 | Jerhotova et al. |
| 9,046,886 B2 | 6/2015 | Chong et al. |
| 9,047,336 B2 | 6/2015 | Hom et al. |
| 9,069,599 B2 | 6/2015 | Martinez et al. |
| 9,098,702 B2 | 8/2015 | Rubin et al. |
| 9,129,105 B2 | 9/2015 | Donley et al. |
| 9,130,988 B2 | 9/2015 | Seifert et al. |
| 9,137,262 B2 | 9/2015 | Qureshi et al. |
| 9,191,400 B1 | 11/2015 | Ptasinski et al. |
| 9,298,895 B2 | 3/2016 | Lim |
| 9,319,426 B2 | 4/2016 | Webb et al. |
| 9,338,134 B2 | 5/2016 | Yin |
| 9,338,180 B2 | 5/2016 | Ramsey et al. |
| 9,430,534 B2 | 8/2016 | Bhattacharya et al. |
| 9,438,563 B2 | 9/2016 | Yin |
| 9,519,756 B2 | 12/2016 | Bitran et al. |
| 9,544,273 B2 | 1/2017 | Fleury et al. |
| 9,548,994 B2 | 1/2017 | Pearcy et al. |
| 9,558,352 B1 | 1/2017 | Dennison et al. |
| 9,560,062 B2 | 1/2017 | Khatri et al. |
| 9,560,068 B2 | 1/2017 | Figlin et al. |
| 9,596,252 B2 | 3/2017 | Coates et al. |
| 9,628,511 B2 | 4/2017 | Ramsey et al. |
| 9,667,656 B2 | 5/2017 | Banerjee et al. |
| 9,667,661 B2 | 5/2017 | Sharma et al. |
| 9,710,672 B2 | 7/2017 | Braun |
| 9,712,549 B2 | 7/2017 | Almurayh |
| 9,742,559 B2 | 8/2017 | Christodorescu et al. |
| 9,767,302 B2 | 9/2017 | Lim |
| 9,805,202 B2 | 10/2017 | Medeiros et al. |
| 9,910,986 B1 | 3/2018 | Saxe |
| 9,973,524 B2 | 5/2018 | Boyer et al. |
| 10,050,992 B2 | 8/2018 | Thyni et al. |
| 10,063,582 B1 | 8/2018 | Feng et al. |
| 10,116,500 B1 | 10/2018 | Long et al. |
| 10,311,231 B1 | 6/2019 | Kayyoor et al. |
| 10,356,125 B2 | 7/2019 | Goutal et al. |
| 10,382,489 B2 | 8/2019 | Das et al. |
| 10,419,903 B2 | 9/2019 | Singh et al. |
| 10,425,223 B2 | 9/2019 | Roth et al. |
| 10,474,820 B2 | 11/2019 | Manadhata |
| 10,491,632 B1 | 11/2019 | Natarajan et al. |
| 10,567,407 B2 | 2/2020 | Tang et al. |
| 10,594,713 B2 | 3/2020 | McLean |
| 10,601,865 B1 | 3/2020 | Mesdaq et al. |
| 10,728,263 B1 | 7/2020 | Neumann |
| 10,735,470 B2 | 8/2020 | Vidas et al. |
| 10,762,206 B2 | 9/2020 | Titonis et al. |
| 10,785,238 B2 | 9/2020 | McLean |
| 10,834,128 B1 | 11/2020 | Rajogopalan et al. |
| 10,853,431 B1 | 12/2020 | Lin et al. |
| 10,915,828 B2 | 2/2021 | Qhi |
| 11,044,263 B2 | 6/2021 | McLean et al. |
| 11,165,862 B2 | 11/2021 | Austin et al. |
| 11,275,831 B1 | 3/2022 | Aouad et al. |
| 2002/0129135 A1 | 9/2002 | Delany et al. |
| 2005/0060295 A1 | 3/2005 | Gould et al. |
| 2005/0138204 A1 | 6/2005 | Iyer et al. |
| 2005/0288939 A1 | 12/2005 | Peled et al. |
| 2006/0012815 A1 | 1/2006 | Ebner et al. |
| 2006/0037076 A1 | 2/2006 | Roy |
| 2006/0195575 A1 | 8/2006 | Delany et al. |
| 2006/0253447 A1 | 11/2006 | Judge |
| 2007/0192867 A1 | 8/2007 | Miliefsky |
| 2007/0226248 A1 | 9/2007 | Darr |
| 2007/0226807 A1 | 9/2007 | Ginter et al. |
| 2008/0077593 A1 | 3/2008 | Abrams et al. |
| 2008/0219334 A1 | 9/2008 | Brainos et al. |
| 2008/0255997 A1 | 10/2008 | Bluhm et al. |
| 2008/0262991 A1 | 10/2008 | Kapoor |
| 2008/0320000 A1 | 12/2008 | Gaddam |
| 2009/0198682 A1 | 8/2009 | Buehler et al. |
| 2010/0083374 A1 | 4/2010 | Schmitlin et al. |
| 2010/0125913 A1 | 5/2010 | Davenport et al. |
| 2010/0251329 A1 | 9/2010 | Wei et al. |
| 2011/0004771 A1 | 1/2011 | Matsushima et al. |
| 2011/0179492 A1 | 7/2011 | Markopoulou et al. |
| 2011/0276604 A1 | 11/2011 | Hom et al. |
| 2011/0276716 A1 | 11/2011 | Coulson |
| 2012/0072983 A1* | 3/2012 | McCusker ............ H04L 63/126 726/22 |
| 2012/0117640 A1 | 5/2012 | Ramsey et al. |
| 2012/0185275 A1 | 7/2012 | Loghmani |
| 2012/0024673 A1 | 9/2012 | Raad |
| 2012/0254333 A1 | 10/2012 | Chandramouli |
| 2012/0260341 A1 | 10/2012 | Chan et al. |
| 2013/0104191 A1 | 4/2013 | Peled et al. |
| 2013/0138428 A1 | 5/2013 | Chandramouli |
| 2013/0173620 A1 | 7/2013 | Takenouchi |
| 2013/0226938 A1 | 8/2013 | Risher et al. |
| 2013/0238319 A1 | 9/2013 | Minegishi et al. |
| 2013/0282746 A1 | 10/2013 | Balko et al. |
| 2013/0291103 A1 | 10/2013 | Davenport et al. |
| 2013/0318604 A1 | 11/2013 | Coates et al. |
| 2014/0041028 A1 | 2/2014 | Ramsey et al. |
| 2014/0047544 A1 | 2/2014 | Jakobsson |
| 2014/0051432 A1 | 2/2014 | Gupta et al. |
| 2014/0222712 A1 | 8/2014 | Samaha et al. |
| 2014/0373151 A1 | 12/2014 | Webb et al. |
| 2015/0019323 A1 | 1/2015 | Goldberg et al. |
| 2015/0040225 A1 | 2/2015 | Coates et al. |
| 2015/0074390 A1 | 3/2015 | Stoback |
| 2015/0135287 A1 | 5/2015 | Medeiros et al. |
| 2015/0135320 A1* | 5/2015 | Coskun .................. H04L 43/04 726/24 |
| 2015/0156212 A1 | 6/2015 | Khatri et al. |
| 2015/0186618 A1 | 7/2015 | Poorvin et al. |
| 2015/0222652 A1 | 8/2015 | Ramsey et al. |
| 2015/0271047 A1 | 9/2015 | McLean |
| 2015/0324457 A1 | 11/2015 | McLean |
| 2016/0006749 A1* | 1/2016 | Cohen .................... G06Q 40/12 726/23 |
| 2016/0014140 A1 | 1/2016 | Akireddy et al. |
| 2016/0014151 A1 | 1/2016 | Prakash |
| 2016/0078365 A1 | 3/2016 | Baumard |
| 2016/0099963 A1 | 4/2016 | Mahaffey et al. |
| 2016/0139886 A1 | 5/2016 | Perdriau et al. |
| 2016/0156655 A1* | 6/2016 | Lotem ................ H04L 63/1416 726/23 |
| 2016/0182546 A1 | 6/2016 | Coates et al. |

(56) References Cited

U.S. PATENT DOCUMENTS

| | | |
|---|---|---|
| 2016/0241591 A1 | 8/2016 | Ramsey et al. |
| 2016/0277423 A1 | 9/2016 | Apostolescu et al. |
| 2016/0313709 A1 | 10/2016 | Biesdorf et al. |
| 2016/0337400 A1 | 11/2016 | Gupta |
| 2016/0342805 A1 | 11/2016 | Lim |
| 2016/0378978 A1 | 12/2016 | Singla et al. |
| 2017/0026343 A1 | 1/2017 | Wardman |
| 2017/0063893 A1 | 3/2017 | Franc et al. |
| 2017/0063905 A1* | 3/2017 | Muddu ............... H04L 41/0893 |
| 2017/0098087 A1 | 4/2017 | Li |
| 2017/0111379 A1 | 4/2017 | Khatri et al. |
| 2017/0140295 A1 | 5/2017 | Bandara |
| 2017/0142149 A1 | 5/2017 | Coates et al. |
| 2017/0169154 A1 | 6/2017 | Lin et al. |
| 2017/0171228 A1 | 6/2017 | McLean |
| 2017/0180418 A1 | 6/2017 | Shen |
| 2017/0201381 A1 | 7/2017 | Kinder et al. |
| 2017/0201431 A1 | 7/2017 | Kinder et al. |
| 2017/0201490 A1 | 7/2017 | Kinder et al. |
| 2017/0201548 A1 | 7/2017 | Kinder et al. |
| 2017/0024475 A1 | 8/2017 | Kinder et al. |
| 2017/0243004 A1 | 8/2017 | Kinder et al. |
| 2017/0243005 A1 | 8/2017 | Kinder et al. |
| 2017/0244734 A1 | 8/2017 | Kinder et al. |
| 2017/0244754 A1 | 8/2017 | Kinder et al. |
| 2017/0244762 A1 | 8/2017 | Kinder et al. |
| 2017/0318033 A1 | 11/2017 | Holland et al. |
| 2017/0318034 A1 | 11/2017 | Holland et al. |
| 2017/0359368 A1 | 12/2017 | Hodgman |
| 2018/0077189 A1 | 3/2018 | Doppke et al. |
| 2018/0089574 A1 | 3/2018 | Goto |
| 2018/0091306 A1 | 3/2018 | Antonopoulos et al. |
| 2018/0103010 A1 | 4/2018 | Diaz Cuellar et al. |
| 2018/0124073 A1 | 5/2018 | Scherman et al. |
| 2018/0124085 A1 | 5/2018 | Frayman et al. |
| 2018/0152480 A1 | 5/2018 | Kinder et al. |
| 2018/0181599 A1 | 6/2018 | Crabtree et al. |
| 2018/0288198 A1 | 10/2018 | Pope et al. |
| 2018/0036755 A1 | 12/2018 | Musuvathi et al. |
| 2019/0014149 A1 | 1/2019 | Cleveland et al. |
| 2019/0037406 A1 | 1/2019 | Wash |
| 2019/0050554 A1 | 2/2019 | Fiske |
| 2019/0068630 A1 | 2/2019 | Valecha et al. |
| 2019/0095801 A1 | 3/2019 | Saillet et al. |
| 2019/0102554 A1 | 4/2019 | Luo et al. |
| 2019/0102646 A1 | 4/2019 | Redmon |
| 2019/0104154 A1 | 4/2019 | Kumar et al. |
| 2019/0122258 A1 | 4/2019 | Bramberger et al. |
| 2019/0132344 A1 | 5/2019 | Lem et al. |
| 2019/0141079 A1 | 5/2019 | Vidas et al. |
| 2019/0149564 A1 | 5/2019 | McLean |
| 2019/0173919 A1 | 6/2019 | Irimie |
| 2019/0242718 A1* | 8/2019 | Siskind ............... G01C 21/3461 |
| 2019/0258807 A1 | 8/2019 | DiMaggio et al. |
| 2019/0297096 A1 | 9/2019 | Ahmed et al. |
| 2019/0342296 A1 | 11/2019 | Anandam et al. |
| 2019/0347433 A1 | 11/2019 | Chakravorty et al. |
| 2019/0377832 A1 | 12/2019 | McLean et al. |
| 2019/0379678 A1 | 12/2019 | McLean et al. |
| 2020/0036750 A1 | 1/2020 | Bahnsen |
| 2020/0036751 A1 | 1/2020 | Kohavi |
| 2020/0186544 A1* | 6/2020 | Dichiu ............... H04L 63/1416 |
| 2020/0195683 A1 | 6/2020 | Kuppa et al. |
| 2020/0259791 A1 | 8/2020 | Garcia et al. |
| 2020/0274894 A1* | 8/2020 | Argoeti ............... G06F 7/556 |
| 2020/0285737 A1 | 9/2020 | Kraus et al. |
| 2020/0285952 A1 | 9/2020 | Liu et al. |
| 2020/0314122 A1* | 10/2020 | Jones ............... G06F 16/9566 |
| 2020/0336497 A1* | 10/2020 | Seul ............... H04L 63/1433 |
| 2020/0351285 A1 | 11/2020 | Eisenkot et al. |
| 2020/0351302 A1 | 11/2020 | Kyle |
| 2020/0351307 A1 | 11/2020 | Vidas et al. |
| 2020/0356665 A1* | 11/2020 | Denney ............... G06N 5/003 |
| 2020/0358795 A1 | 11/2020 | Urbanski et al. |
| 2020/0358819 A1 | 11/2020 | Bowditch et al. |
| 2020/0364338 A1* | 11/2020 | Ducau ............... G06N 3/08 |
| 2020/0394309 A1 | 12/2020 | Angelo et al. |
| 2021/0067562 A1 | 3/2021 | Kinder et al. |
| 2021/0109797 A1 | 4/2021 | Zhou |
| 2021/0112087 A1 | 4/2021 | Tassoumt |
| 2021/0112090 A1 | 4/2021 | Rivera et al. |
| 2021/0173930 A1 | 6/2021 | Dahal |
| 2021/0185057 A1 | 6/2021 | McLean |
| 2021/0226970 A1 | 7/2021 | Ross et al. |
| 2021/0258327 A1* | 8/2021 | Felke ............... G05B 23/0283 |
| 2022/0038424 A1* | 2/2022 | Liu ............... H04L 63/20 |
| 2022/0070182 A1 | 3/2022 | Bowditch et al. |

FOREIGN PATENT DOCUMENTS

| | | |
|---|---|---|
| WO | WO2007/002749 A2 | 1/2007 |
| WO | WO2007/090605 A1 | 8/2007 |
| WO | WO2010/059843 A2 | 5/2010 |
| WO | WO2021/067238 A1 | 4/2021 |

OTHER PUBLICATIONS

Alkhawlani, Mohammed, Elmogy, Mohammed and Elbakry, Hazem; "Content-based image retrieval using local features descriptors and bag-of-visual words"; International Journal of Advanced Computer Science and Applications, vol. 6 No. 9 2015; pp. 212-219; 2015.

Buber, E., Demir, O. and Sahingoz, O.K.; "Feature selections for the machine learning based detection of phishing websites"; 2017 International Artificial Intelligence and Data Processing Symposium (IDAP), 2017; pp. 1-5; doi: 10.1109/DAP.2017.8090317; 2017.

Lin, Tsung-Yi, et al.; "Microsoft coco: Common objects in context"; European Conference on Computer Vision, Springer, Cham, 2014; 2014.

Liu, Y., Wang, Q., Zhuang, M. and Zhu, Y.; Reengineering Legacy Systems with RESTFul Web Service; 2008 32$^{nd}$ Annual IEEE International Computer Software and Applications Conference, 2008; pp. 785-790; doi: 10.1109/COMPSAC.2008.89; 2008.

White, Joshua S., Matthews, Jeanna N., and Stacy, John L.; A method for the automated detection phishing websites through both site characteristics and image analysis Cyber Sensing 2012; vol. 8408; International Society for Optics and Photonics, 2012; 2012.

URLVoid; URLVoid.com; retrieved from archives.org: https: web. archive.org/web/20180730215132/https.://www.urlvoid.com/); Published Jul. 30, 2018.

Buyukkayhan, Ahmet Sali; Oprea, Alina; Li, Zhou; and Robertson, William; "*Lens on the endpoint; Hunting for malicious software through endpoint data analysis*"; International Symposium on Research in Attacks, Intrusions, and Defenses; RAID 2017: Research in Attacks, Intrusions, and Defenses Proceedings; pp. 73-79; Sep. 18-20, 2017; Atlanta, GA, USA.

SECUREWORKS—Log Management—Protect your infrastructure from known and emerging threats; www.secureworks.com/resources/ds-log-management; 2015 (available).

Sofya Raskhodnikova & Adam Smith; CSE 598A Algorithmic Challenges in Data Privacy; Lecture 2; Jan. 19, 2010.

* cited by examiner

SYSTEMS AND METHODS FOR IDENTIFYING ATTACK PATTERNS OR SUSPICIOUS ACTIVITY IN CLIENT NETWORKS

BACKGROUND

In general, managed network or system security programs or platforms are designed to try to identify attack patterns and suspicious activity from malicious actors and to allow actions to be taken to investigate or remedy potential compromise events. This has resulted in somewhat of a cat-and-mouse game, with "good guys" on one side trying to counteract "bad guys" on the other side; but unfortunately, the "good guys" typically are fundamentally disadvantaged, since a "bad guy" can take actions that may seem relatively small, for example, using rudimentary, relatively cheap technology, that may have very large impact and require large expensive efforts on behalf of the "good guys." Many times the attack patterns taken by malicious actors only become recognizable in hindsight, often after a compromise event has occurred. Existing systems and methods furthermore often struggle to correlate malicious behaviour across numerous sources of telemetry, allowing malicious attackers to operate on networks undetected.

As a result of these and other factors, it is becoming more and more difficult to identify attack patterns or suspicious activity from threat or other malicious actors operating in computer networks within the sea of normal, legitimate network telemetry. Put another way, as threat and other malicious actors continue to modify/refine their attack patterns or actions to try to mimic normal message traffic or activity, it is becoming increasingly difficult to separate artifacts of attack patterns and suspicious activities from normal network telemetry. These circumstances further can lead to significant false positives in identifying compromise events, reducing confidence in available systems and methods.

Accordingly, it can be seen that a need exists for systems and methods that not only can identify abnormal, malicious activities, but that can also associate such activities with attack patterns or known suspicious activities to increase confidence in the detection of compromise events that have actually occurred. Further, such systems and methods should efficiently present any compromise events to clients with enough context and information that allows them to investigate and/or attempt to take remedial measures with the appropriate scope.

The present disclosure is directed to the foregoing and other related, and unrelated, problems or issues in the relevant art.

SUMMARY

Briefly described, according to various aspects, the present disclosure includes systems and methods for identifying malicious actors or malicious activities, such as systems and methods for identifying threat or other malicious actors operating in one or more computer networks by extracting information related to these actor's attack patterns or suspicious activity from the sea of normal, legitimate activity across the one or more computer networks. Attack patterns can include actions or activities related to various computer network attacks or attempted attacks, such as malware attacks, phishing attacks, automated attacks, backdoor attacks, port attacks, malignant employees, etc., as well as other artifacts or indicators of suspicious or threat actors taking actions or otherwise operating on computer networks.

In one embodiment, a system for identifying attack patterns or suspicious activity can include a normalizer, a profile builder, at least one primitive creator, and a compromise detector. In addition, a client portal also can be utilized or otherwise provided. The normalizer receives raw data from a plurality of clients and structures the raw data into one or more structured data sets. The profile builder builds or populates one or more historical, baseline activity profiles. The baseline activity profiles can be developed for each client, and, in some embodiments, for entities, e.g., employees, users, devices, etc. or other entities, associated with the clients. For example, the profile builder can identify features in the one or more structured data sets and provide information (e.g., frequency information related to the features) to one or more databases for building the one or more historical baseline profiles.

The primitive creator generates primitives from the one or more structured data sets. Primitives generally include items, elements, etc. in the one or more structure data sets that are possibly indicative of attack patterns or suspicious activity. In some embodiments, primitives can be at least partially defined by highly improbable network telemetry. For example, the primitive creator can identify or extract features in the one or more data sets and compare the identified or extracted features to information (e.g., frequency information) in the one or more historical, baseline activity profiles. For each of the identified or extracted features found to occur below a prescribed frequency threshold based on information in one or more of the historical, baseline activity profile(s), the primitive creator creates or otherwise provides corresponding primitives. The features extracted by the primitive creator generally can correspond to the features extracted to build or populate the one or more historical, baseline activity profiles, and in this regard, the one primitive creator can compare these extracted features against their historical frequency or occurrence reflected in in the activity baseline profile(s) to determine whether the relevant extracted features represent improbable network telemetry and should be identified as primitives that potentially represent or suggest attack patterns or other suspicious activities.

The compromise detector receives primitives from the primitive creator (or other additional primitive creators), and organizes the received primitives into groups according to prescribed grouping information, e.g., populates or provides primitives into session windows based on client or entity information. The compromise detector then identifies specific combinations or sequences of primitives in the groups. For each identified combination or sequence of primitives that meets one or more set criterion, the compromise detector generates a corresponding compromise event.

The client portal receives compromise events or other information related thereto from the compromise detector to notify affected clients of the events indicating an identified attack pattern or suspicious activity to facilitate investigation or remediation thereof.

In one example, the profile builder can populate entity profiles for each entity associated with a particular client with information related to the identified or extracted features, and also populate client profiles for each of the clients with information related to the identified or extracted features. The primitive creator can compare the identified or extracted features to the information in a corresponding entity profile, and if the identified or extracted features in comparison to the information in the entity profile meets a selected or determined entity frequency threshold, the at least one primitive creator may establish or elevate a temporary or staged primitive to be investigated further by the primitive creator. Thereafter, the primitive creator further can compare the identified or extracted features corresponding to each staged or temporary primitive to information in a corresponding client profile, and, if the identified or extracted features in comparison to the information in the corresponding client profile meets a selected or determined client frequency threshold, the at least one primitive creator can create a corresponding primitive to be provided to the compromise detector.

In some variations, the profile builder and the primitive creator can be the same, or part of the same, component that can populate one or more historical, baseline activity profile(s) with information (e.g., frequency information) related to identified features from or otherwise present in one or more data sets and can extract or otherwise identify such features in subsequent/new data sets, e.g., as subsequent/new data sets are received, and compare the features to or otherwise look up a historical frequency or occurrence thereof in the one or more historical, baseline activity profile(s). If the frequency or occurrence of certain features is below a prescribed frequency threshold or other selected criterion indicating that the presence or occurrence of the certain features in the subsequent/new data sets represents improbable activity on a network for a particular client and/or entity associated therewith, one or more primitives can be generated corresponding to these features.

The system further can include at least one additional primitive creator that creates primitives independent of historical client or entity information. The at least one additional primitive creator can include an indicator of compromise primitive creator, a business email compromise primitive creator, a cloud account hijacking primitive creator, other additional primitive creators that do or do not rely on historical information, or combinations thereof.

The compromise detector can group the received primitives into session windows, which can be open or otherwise available for a prescribed time period. The compromise detector further can generate compromise events if/when the received primitives in one of the session windows meets at least one selected criterion, such as the primitives in the session window include a number of primitives that exceed a prescribed number, the primitives in the session window match a specific combination or sequence of primitives that relate to known attack patterns or suspicious activities, the primitives in the session window are found to likely correspond to one or more attack patterns or suspicious activities according to a prescribed probability, or combinations thereof.

The system further can include a client value machine learning system that receives information from the clients through the client portal as one or more inputs, and generates one or more outputs that are provided to the compromise detector to suppress events below a certain probability threshold. Thus, the system can be updated and/or passively tuned, with minimal human intervention required, through client feedback on reported compromise events.

In one embodiment, a method for identifying attack patterns or suspicious activity is provided. The method can include receiving data from a plurality of clients, and building one or more baseline activity profiles for each client of the plurality of clients or entities associated therewith based on the received data. The method also can include identifying or extracting features in the one or more data sets, and comparing the identified features to information in the one or more baseline activity profiles for creation of primitives for identified or extracted features that meet, e.g., are below, a prescribed frequency threshold. Thereafter, the method can include organizing the created primitives into groups according to prescribed grouping information, identifying specific sequences or combinations of primitives in the groups, and generating a compromise event for each identified signature, combination, or sequence of primitives that meet a particular threshold criterion. Then, the method can include notifying affected clients of each generated compromise events to indicate an identified attack pattern or suspicious activity and facilitate investigation or remediation thereof.

Various objects, features and advantages of the present disclosure will become apparent to those skilled in the art upon a review of the following detail description, when taken in conjunction with the accompanying drawings.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION

The following description in combination with the figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
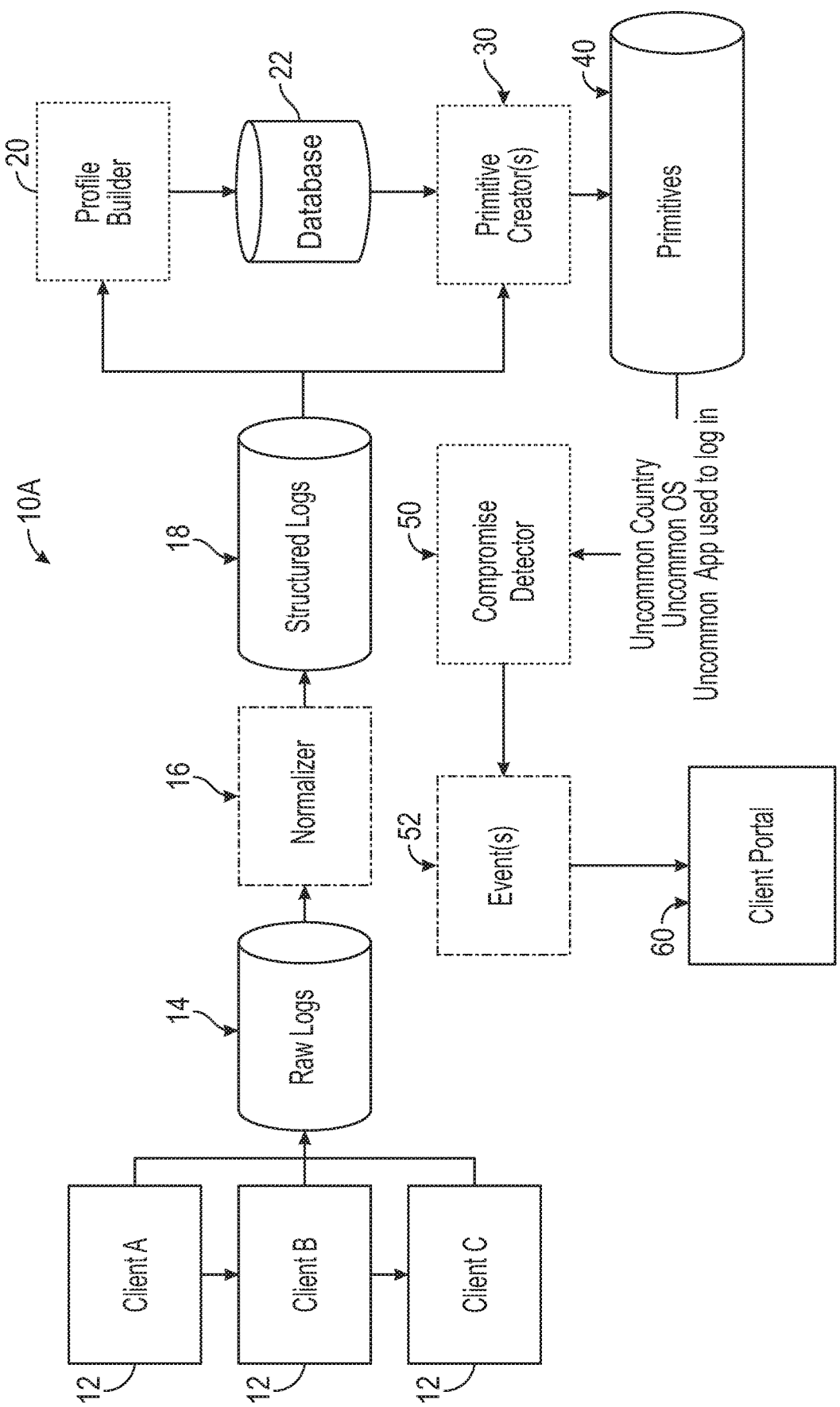
FIG. 1 is a schematic illustration of a system for identifying attack patterns or suspicious activity according to one aspect of the present disclosure.
Figure 2:
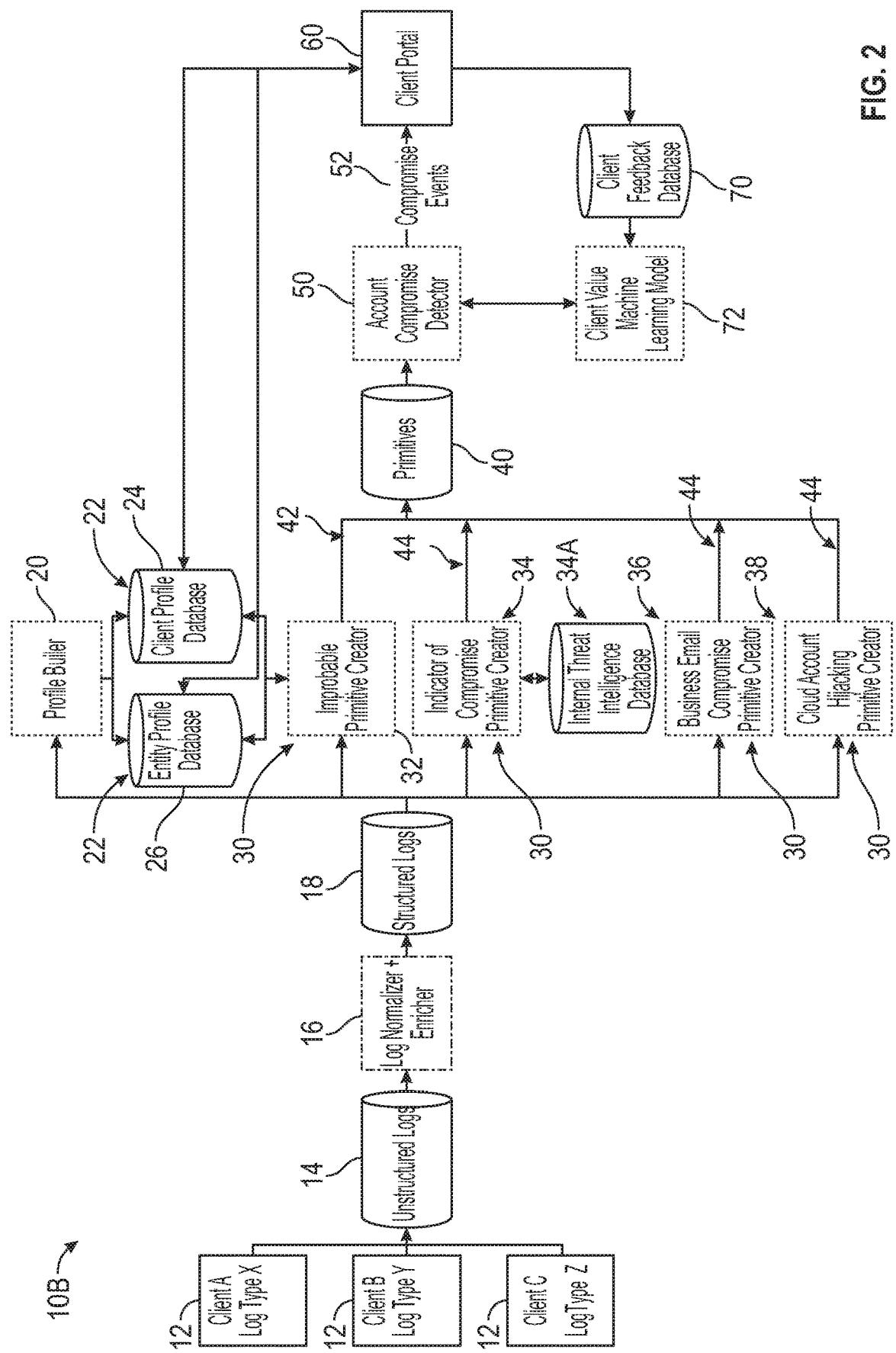
FIG. 2 is a schematic illustration of a system for identifying attack patterns or suspicious activity according to another aspect of the present disclosure.
Figure 5:
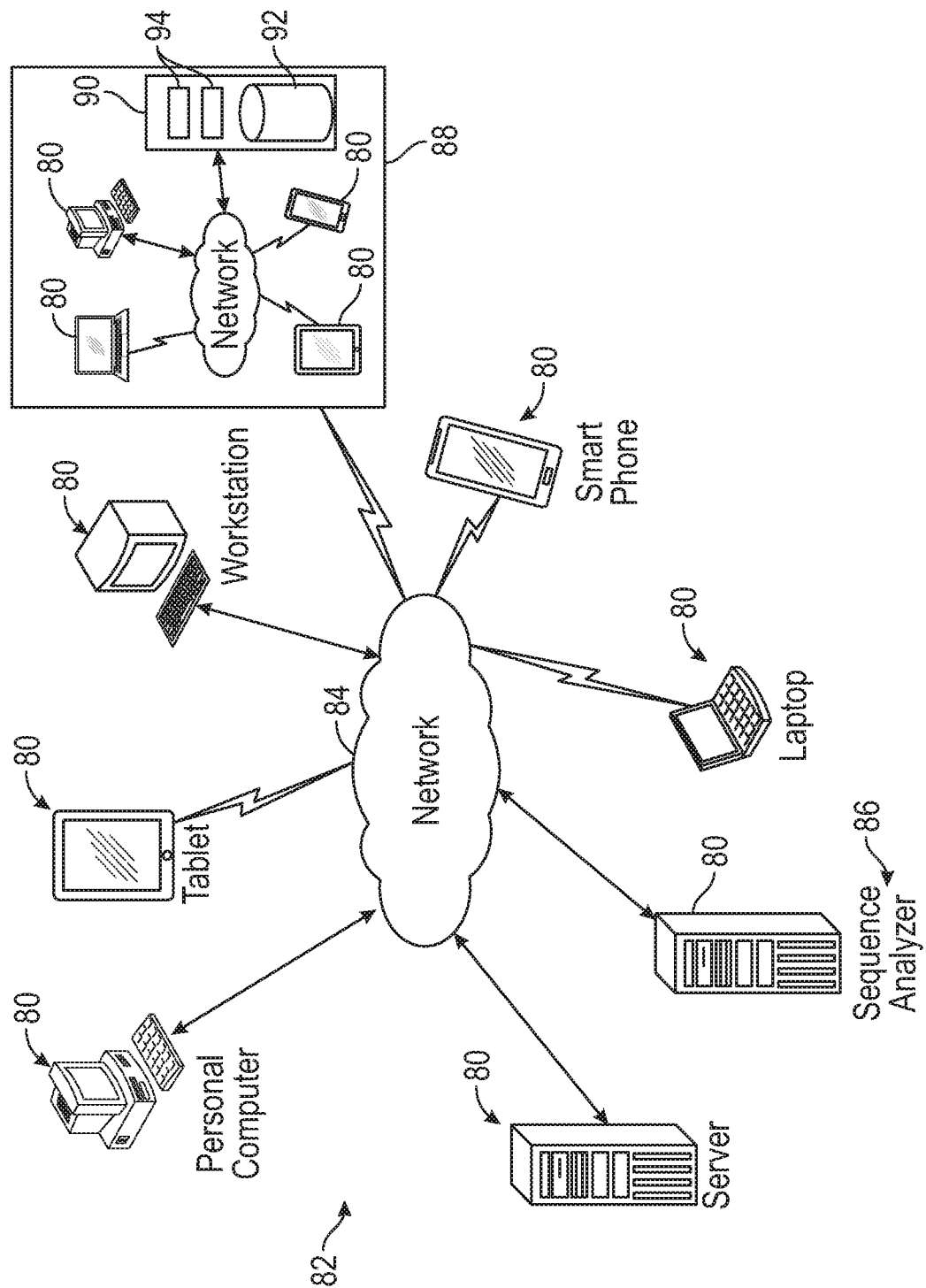
FIG. 5 is a schematic illustration of a networked system of information handling systems according to one example of the present disclosure.

FIGS. 1-2 show schematic diagrams of systems 10A/10B for detecting threat activity, e.g., including identifying attack patterns or suspicious activity by threat or other malicious actors operating in one or more client 12 managed computer networks or other networked computer systems, according to aspects of the present disclosure. Clients 12 can include businesses, organizations, etc., including members of various industries or individuals that have or manage one or more computer networks or networked systems. Clients 12 also can include other parties, such as by security researchers, analyst, etc., or other parties including parties whose networks are monitored externally, such as by a Managed Security Service Provider ("MSSP"). An example client managed computer networked system 82 of information handling systems 80 is shown in FIG. 5.

As FIGS. 1-2 indicate, the system 10A/10B receives and consumes data 14 from a plurality of clients 12, and generates detailed compromise events, such as notices or records that notify affected clients 12 of these events or other incidences of compromise for specific entities associated with the clients. An entity generally includes any singular, identifiable and separate object, such as an individual, an information handling system (e.g., a computing device 80 shown in FIG. 5) or an application associated with a client 12. The client data 14 generally is received and consumed as raw or unstructured data. In one example, the raw or unstructured data 16 will include unstructured activity logs representing network activity and other available telemetry associated with entities, including, but not limited to, user authentication events, configuration audit records, cloud API logs, etc. The client data 14 also can include other network telemetry or other information related to the clients 12 and associated entities without departing from the scope of the present disclosure.

The system 10A/10B can include a normalizer 16 that receives and normalizes or otherwise structures the raw data 14 into one or more normalized or structured data sets 18 (FIGS. 1-2). For example, the unstructured logs are normalized to structured logs with a prescribed schema, such that any new source of telemetry or data can be easily consumed by the system 10A/10B, e.g., making the system 10A/B agnostic to the client data type. For example, as shown in FIG. 2, the system 10B can be configured to consume network activity or other data from clients A and B, having a specific log types, e.g., log types X and Y respectively, and little effort is required in order for the system 10B to be updated or set up to consume network activity or other data from another client, e.g., client C, with a different log type from that of clients A and B, such as log type Z. Although FIGS. 1-2 show that received client data 14 is normalized/structured, in some variations, the system 10A/10B can be configured to consume one or more specific data types, formats, schemas, etc., without normalizing or otherwise structuring the received data.

The normalizer 20 further can be configured to enrich or otherwise augment the raw data 14 (FIG. 2). For example, when the raw data 14 has been normalized to a structured schema, or during normalization or structuring thereof, specific indicators, such as IP addresses present in the raw data, can be enriched by an intelligence dataset that includes specific information, including but not limited to geolocation data, ISP configuration, type of proxy used, etc. . . . .

As additionally indicated in FIGS. 1-2, the system 10A/10B includes a profile builder 20 that receives and processes one or more data sets or other relevant activity telemetry received from the clients 12 and determines or generates a historical, baseline activity profile of expected behavior for the clients 12 and entities associated therewith. More specifically, the profile builder 20 consumes the normalized logs 18, identifies or extracts certain features from the normalized logs 18, and provides information related to those features to one or more profile databases 22 for building or developing client and/or entity profiles. That is, over time a profile of expected behavior can be built for each client and/or one or more entities associated therewith. The profile builder 20 can be set up or updated to extract various, selected features, such as by a system operator (e.g., an MSSP, individual clients, or other parties). These features (also referred to as profile building features) can include values, aspects, artifacts, other information, etc. in the logs 18 that relate to or represent various network telemetry including, but not limited to, login geolocation or other location information, device type, applications or operating systems used, communications between devices, specific action, events, or other values, characteristics, aspects, etc., reflected in the logs 18 and/or other received data, or combinations thereof.

FIG. 2 shows that the profile builder 20 can provide information to one or more client profile databases 24, as well as one or more entity profile databases 26 to populate client and entity profiles with information related to extracted or identified features. The system 10B can include a plurality of client databases 24 corresponding to each client 12, and a plurality of entity databases 26 corresponding to various entities associated with each client 12. The profile builder 20 generally provides or updates information related to the frequencies for extracted/identified features in an entity profile database 26 corresponding to the relevant entity (e.g. the entity referenced in the log from which a profile building feature was extracted or identified). The profile builder 20 can build or populate entity profiles for users and also for identifiable devices on a specific client 12's network. For example, the profile builder 20 can extract features related to communications between devices, and can track the frequency that a device communicates with other devices on a specific client 12's network. The profile builder 20 also provides or updates information related to the number of distinct entities associated with the extracted feature in the client profile database 26.

According to one example, the profile builder 20 can receive a log related to an authentication event for a specific entity, such as a user of a prescribed client's system, e.g., "entity@example.corp," from a particular client, e.g., client B, stating that the specific entity, e.g., "entity@example.corp," authenticated to a particular director for an application (e.g., an Active Directory for the "Microsoft Teams" application, as provided by Microsoft Corp. of Redman, Wash.) using a particular operating system (e.g., "MacOS" as provided by Apple Inc. of Cupertino, Calif.) with an IP address originating from a specific country (e.g., the "UK"). If the profile builder 20 is set up to track and extract specific features related to the application, operating system, and country, then these features will be extracted by the profile builder and the corresponding frequencies for these values will be updated in the corresponding entity profile database 26. In addition, the distinct count of entities associated with these selected extracted features will be updated by the profile builder in the corresponding client profile database 24.

In some variations, when an entity's profile is updated by a new log, the profile builder 20 can update two data entries in the relevant entity database 26 including the entry for the entity's current day and the entry for the entity's current month. For example, if an entity has network activity through Feb. 27, 2020 and Mar. 13, 2020, the entity profile database 26 can have fifteen "day" data entries for the entity and two "month" entries for the entity. The aggregation of the fifteen "day" data entries can be equal to the aggregation of the two "month" data entries. The month data entries can allow the efficient aggregation of an entity's historical profile by the primitive creator 30, discussed further below, while the day data entries allow a time visualization of the entity's profile for exploratory purposes in the client portal 60, discussed further below.

As FIGS. 1-2 additionally indicate, the system 10A/10B also includes one or more primitive creators 30 configured to identify or generate primitives 40. A primitive 40 generally is a single item of data, e.g., a single log, or a part thereof, that is possibly indicative or suggestive of an attack pattern(s) or suspicious activity. Primitives generally can include improbable primitives relating to one or more actions or events that are highly improbable for a specific entity and/or a client as a whole because it exceeds thresholds set for improbable activity (e.g., if the user logs in using a tablet device that no user in the entire organization has ever used, an improbable primitive will be created). Primitives also can include suspicious primitives relating to one or more actions or events that are suspicious on their own, e.g., because the action(s) matches a signature of a known attack pattern (e.g., if a given user turns off their two-factor authentication against company policy a suspicious primitive will be created at the time the event was seen). The one or more primitive creators 30 generally check all inbound client data, or other relevant telemetry, events, etc., against the set conditions to identify, create, and save primitives 40 in real time.

The system 10B can include a plurality of primitive creators 30 each consuming received client data, e.g., structured logs 18, to identify or provide various primitives 40, as generally indicated in FIG. 2. Structured logs 18 or information related to other relevant network telemetry are consumed by each of the primitive creators 30 in parallel in order to facilitate the detection of suspicious activity. Some primitive creators 30 can rely on identifying improbable entity behavior based on historical frequencies at the client and entity level (e.g., improbable primitives), while other primitive creators 30 rely on identifying suspicious entity behavior based on known indicators of compromise or threat signatures (e.g., suspicious primitives).

FIG. 2 indicates that the plurality of primitive creators 30 can include at least one improbable primitive creator 32 that relies on historical network formation (e.g., historical frequency numbers or information) and interacts with one or more profile databases 22, e.g., the entity profile database 26 and the client profile database 24, for the identification or generation of improbable primitives. For example, the improbable primitive creator 32 consumes normalized logs 18 and extracts features from the logs 18. These features (also referred to as primitive features) generally include information, values, artifacts, etc., in the data that potentially are, include, or relate to primitives, e.g., depending on a frequency or level of occurrence thereof. The improbable primitive creator 32 can be set up or updated to extract or identify various, selected features, such as by a system operator (e.g., an MSSP, individual clients, or other parties). The features generally correspond to the features used for profile building, and thus, the improbable primitive creator 32 can compare these extracted features against their historical frequency in the activity baseline profile(s) to determine whether these extracted features represent improbable activity. In this regard, as subsequent/new logs are received, selected features can be identified or extracted therefrom by the improbable primitive creator 32 and compared to historical frequency information in historical, baseline activity profiles populated by the profile builder 20 to determine whether these select features have a low occurrence or otherwise represent improbable activity for a given client 12 network, and if so, generate primitives relating to these low occurring/improbable features.

The improbable primitive creator 32 compares the extracted or identified features to information in the client 24 and/or entity 26 databases and creates one or more improbable primitives 42 if a set or selected threshold. In some embodiments, the criterion includes one or more probability thresholds that must be met to affect creation of improbable primitives 42. For example, an entity threshold and a client threshold must be met for creation of an improbable primitive 42. An entity threshold can include a probability or frequency threshold that a specific feature must meet as compared to a particular entity's baseline reflected in the relevant entity database 26 to be deemed improbable. A client threshold can include a probability or frequency threshold that the specific feature must meet as compared to the client 12's (e.g., the client associated with the entity) baseline reflected in the relevant client database 24 to be deemed improbable. In some variations, both the client and entity thresholds must be meet by a particular feature(s) in order to initiate the creation of an improbable primitive 42.

More specifically, in some embodiments, the primitive creator 32 compares extracted features from a log 18 with the queried entity profile 26. If the frequency for any of the features extracted from the log 18 is below the pre-configured threshold, then an improbable primitive 42 for the entity and the offending feature is staged for creation. That is, the entity and relevant or offending feature that is below the pre-configured threshold is at least temporarily elevated for further investigation. Each feature may have a different configured threshold, such that the threshold required for staging a one type of primitive, e.g., a country primitive, can be different than the threshold required for staging another, e.g., an application primitive. Furthermore, clients, MSSPs, etc. may configure different thresholds for various primitive types. For each of the staged entity and offending/relevant features, e.g., temporarily elevated for further investigation, the improbable primitive creator 32 queries the client profile database 24 in order to compare the offending feature with the historical frequency across the entire client network. If the percentage of entities tracked in the client's network that have been previously associated with the relevant primitive is below a pre-configured threshold, then an improbable primitive 42 is created.

FIG. 2 shows the profile builder 20 and the primitive creator 32 as separate components; however, the profile builder 20 and improbable primitive creator 32 can be incorporated as part of the same component without departing from the scope of the present disclosure. In this regard, the profile builder/primitive creator can populate one or more historical, baseline activity profile(s) with information (e.g., frequency information) related to identified features from/in one or more data sets, and as subsequent/new data sets are received, can extract or otherwise identify such features in the subsequent/new data sets and compare the features to or otherwise look up a historical frequency or occurrence thereof in the one or more historical, baseline activity profile(s). And, if the frequency or occurrence of certain features is below a prescribed frequency threshold or other selected criterion indicating that the presence of the certain features in the subsequent/new data sets represents improbable activity on a network, one or more primitives can be generated corresponding to the offending/relevant features.

According to one example, an authentication log can arrive in the improbable primitive creator 32 for a specific entity, e.g., a specific user, user@example.corp, from a particular client, such as client A, stating that the specific user, i.e., user@example.corp, authenticated to a directory for a particular application (e.g., Microsoft's Active Directory for the "Sharepoint" Application, as provided by Microsoft Corp. of Redman, Wash.) using a specific operating system (e.g., "Linux"®) with an IP address originating from a particular location, e.g., "China." The improbable primitive creator 32 can query the aggregate entity profile for the specific user, bill@example.corp, and calculate or otherwise determine whether the frequency of the specific user, bill@example.corp, using the particular application, "Sharepoint", meets, e.g., is below or equal to, a pre-configured, entity application threshold; whether the frequency of the specific operative system, "Linux", meets, e.g., is below or equal to, a pre-configured, entity operation system threshold; and whether the particular location, "China", meets, e.g., is below or equal to, a pre-configured, entity country threshold.

If the location, "China", and the operating system, "Linx", meet the prescribed entity thresholds, but the particular application, "Sharepoint", does not, the improbable primitive creator 32 will stage or temporarily update a primitive for the operating system and country features and the specific user (and not the application features), and query the client profile database 24 for the frequency of the operating system and country features (i.e., "Linux" and "China") across the entire client's profile (e.g., client A's entire profile). If the frequency of entities who have been associated with "Linux" is above a pre-configured client operating system threshold (i.e., does not meet the client's operating system threshold), and if the frequency of users who have authenticated from "China" is below a pre-configured client country threshold (i.e., meets the country threshold), a country primitive for bill@example.corp with the relevant context will be created (but an operating system primitive will not). Numerous primitives can be generated from one network activity log, and if the frequencies for the application and operating systems for the foregoing example were below the pre-configured thresholds (i.e., met the prescribed thresholds as well), then three separate primitives would have been created, e.g., application, operating system, and country primitives all would have been created.

Accordingly, with embodiments of the present disclosure, the context for creation of an improbable primitive 42 can consist of numerous attributes, including but not limited to the extracted features, the frequency of the extracted features at the entity and client level, the relevant pre-configured thresholds, and historical frequencies associated with the extracted features.

FIG. 2 further shows that the system 10B can include one or more additional primitive creators 34, 36, 38, such as suspicious primitive creators that generate suspicious primitives, e.g., primitives that are created independently of historical client/entity behavior or information. The one or more suspicious primitive creators 34, 36, 38 can rely on known threat signatures and threat intelligence to facilitate the creation of suspicious primitives 44.

The additional primitive creators can include an indicator of compromise primitive creator 34 (hereinafter "IOC primitive creator") that consumes normalized logs 18 and extracts or identifies features, such as values, artifacts, other information, etc., from the logs 180. The IOC primitive creator 34 can be set to extract or identify various different features including but not limited to, IP addresses, domain names, network traffic information, account activity information, log in information, location information, database read volume information, file size information, port-application traffic information, DNS request information, web traffic information, file information, such as file size, file hashes, etc., command and control activity information, or combinations thereof.

The extracted values, features, etc. then are compared or queried against an internal threat intelligence database 34A in order to determine whether any extracted values, features, etc. have been marked or otherwise identified as suspicious.

The threat intelligence database 34A can include aggregated information related to known threats, suspicious activities, etc., such as blacklists of known threat actors or groups, internal intelligence databases, etc. and other information collected by MSSPs, security researchers or analysts, etc. In one example, an IP address associated with a known threat group can added to the internal threat intelligence database by a security researcher, and if a log associated with a specific entity, e.g., a user user2@example.corp, and this IP address is consumed by the IOC primitive creator 34, then a suspicious primitive 44 for this user, i.e., user2@example.corp, will be created.

Another suspicious primitive creator can include a business email compromise primitive creator 36 (hereinafter "BEC primitive creator"). The BEC primitive creator 36 consumes normalized logs 18 and inspects for logs indicative of business email compromise, such as logs reflecting an inbox rule to redirect emails to an external address or an inbox rule to delete emails that would alert hat the entity has been compromised. That is, if a log including specific information, e.g., indicative of a business email compromise, the BEC primitive creator 36 generally will create a primitive for the relevant entity. The one or more suspicious primitive creators can include other primitive creators that generate primitive if a log includes certain information indicative of suspicious activity, such as a cloud account hijacking primitive creator 38 that creates a primitive if a log includes information indicating or related to a cloud account hijacking or other account hijacking.

FIGS. 1-2 further show that the system 10A/10B includes a compromise detector or primitive aggregator 50 that receives generated primitives from the primitive creators 30. The compromise detector 50 consumes the generated primitives and/or data or information related thereto and determines if/when there is enough evidence to suspect that an entity and/or client 12 has been compromised. The compromise detector 50 organizes primitives into groups according to prescribed grouping information and identifies one or more combinations or sequences of primitives in the groups. If the compromise detector determines that the one or more combinations or sequences of primitives are representative of an attack pattern or suspicious activity, e.g., any of the combinations or sequences corresponds to an attack pattern or suspicious activity meets a threshold criterion, the compromise detector 50 generates one or more events 52.

In one embodiment, the compromise detector 50 groups primitives by both the associated entity and the original event time into a session or activity window. The compromise detector generally creates or generates compromise events 52 based on one or more combinations or sequences of primitives occurring during/within a particular, single session window. The session window can be a flexible window of time (e.g., not a fixed length of time) that can start when an event occurs for a particular entity, e.g., a user of a client's network, and end when that entity's, e.g., user's, account stops showing activity. A session window can span minutes or hours depending on the activity event flow.

The specific session window time period, e.g., the time difference between events that will keep a session window open, is generally configurable, such as by clients, MSSPs, other parties, etc. For example, the event time difference can be set to a prescribed time period, e.g., 20 minutes, and the session window will remain open as long as new events keep occurring within the prescribed time period, e.g., less than 20 minutes, of each other, and the session window for that entity closes when the time between events exceeds the prescribed interval, e.g., exceeds 20 minutes in this example.

It will be understood that there may be a large time gap as to when a primitive arrives at the compromise detector 50 and the event time on the original network log, and thus, the compromise detector 50 may only be concerned with event time on the original network and uses this timestamp to create sessions windows. The session window time period can be set to any particular time period, including minutes, one or more hours, or more, such as a few days. The session window time period can be set for each client intuitively or otherwise based on specific historical client information, e.g., it can be assumed that activity separated by more than hour or more of inactivity for a specific entity represents separate entity sessions, e.g., groups of interactions one entity takes within a period devoted to a particular activity (or closely related activities).

According embodiments of the present disclosure, a session window can group primitives with similar event times, and a session window can begin at the earliest event time. A session timeout generally can be configured to determine the maximum time gap between primitives before a new session window is created. If a primitive arrives with an event time within the specified timeout from the previous primitive, then the session window can be extended in order to include this new primitive. If primitives keep arriving with event times within the selected timeout, then the session window can be extended indefinitely until a maximum pre-configured session window duration is reached. Should one or more primitives arrive where the difference between the new primitive's event time and the temporally previous primitive's event time is greater than the session timeout, then a new session window is created containing only the new primitive.

Furthermore, the order in which primitives arrive to the compromise detector 50 generally is not important, and primitives associated with a session window from many days ago can be added and extend that session window as long as the session window is still cached in the memory of the primitive aggregator. The use of a session window can help to provide a data aggregation strategy that models a more accurate entity session than what is possible with traditional data aggregation methods/processes; rather than having a static session size for all entities, the size of the session varies depending on the entity's behavior.

Figure 3:
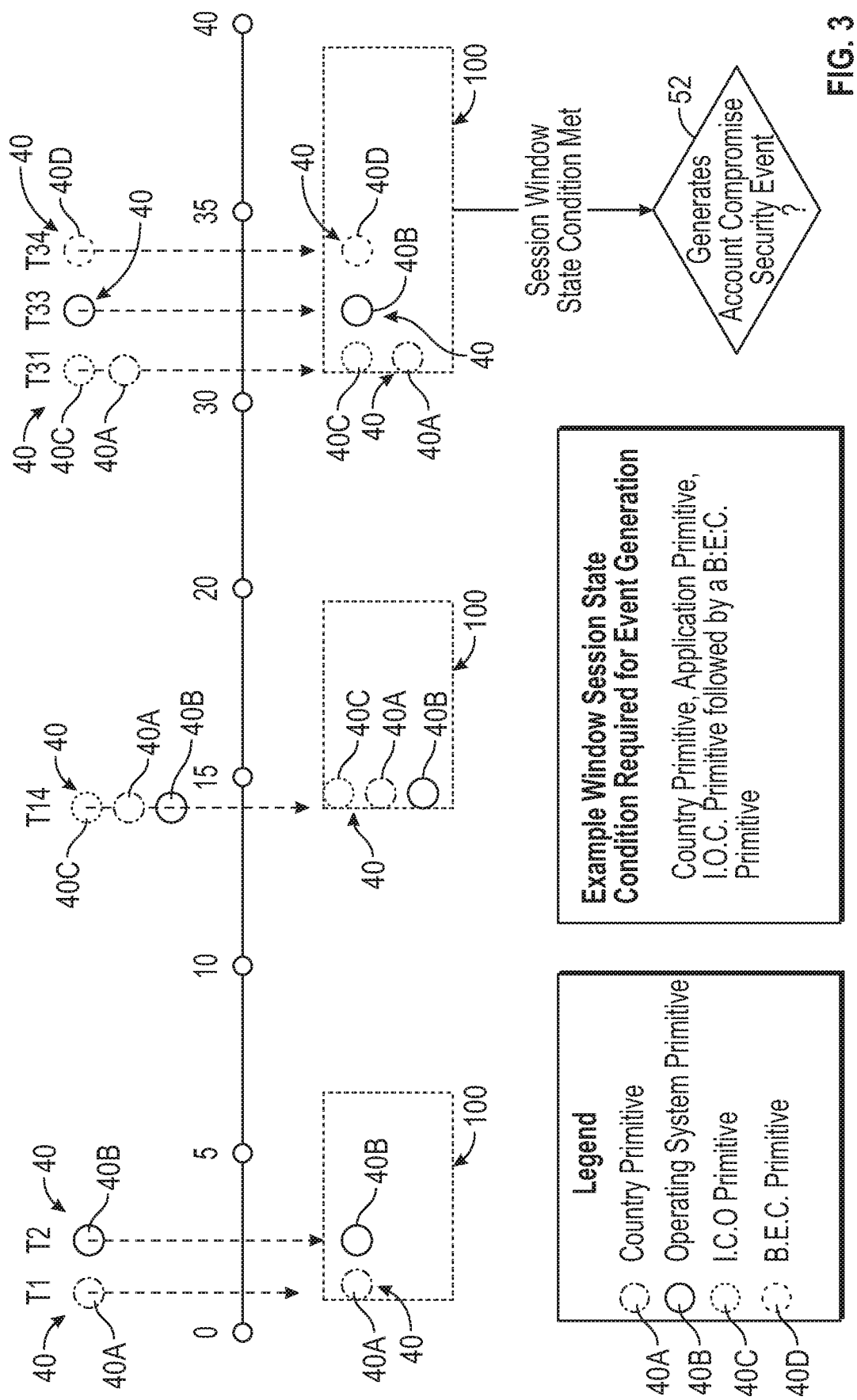
FIG. 3 is a schematic representation of a process for an example session window according to one aspect of the present disclosure.

FIG. 3 shows a schematic diagram of a process for various session windows 100 according to examples of the present disclosure. As indicated in FIG. 3, when one or more new primitives 40 arrive in a session window 100, the compromise detector 50 can determine if the session window 100 includes one or more combinations or sequences of primitives, e.g., type and event time order of the primitives, representative of an attack pattern or suspicious activity. In some examples, a session window 100 for an entity might receive a country primitive 40A at T1 and an operative system primitive at T2 or a session window 100 might receive an IOC primitive 40B, a country primitive 40A, and an operating primitive 40B all at the same time, e.g., T14, but if those types and sequences of a primitive do not represent one or more combinations or sequences representative of an attack pattern or suspicious activity, e.g., if these particular combinations or sequences do not meet a prescribed threshold, e.g., minimum number of primitive, combination and/or sequence match, or threshold probability, the session widow condition is not met and an event 52 is not created.

However, if that session window 100 receives an I.O.C. primitive 40C and a country primitive 40A at T31, an operating system primitive 40 at T33, and subsequently a BEC primitive 40D denoting that an email forwarding rule was created at T34, and a I.O.C. primitive 40C, a country primitive 40A, and an operating system 40B primitive all followed by a business email compromise primitive 40D present in the session window 100 is a signature or sequence of primitives matching or likely to represent an attack pattern or suspicious activity, then an event 52 will be created by the compromise detector 50 and sent to a client portal 60. This signature is described by example only and is but one of many possible combinations or sequences that might result in creation of a compromise event 52. Numerous primitives denoting the same activity can often be created, which may lead to duplicate events being generated. The present disclosure can avoid this issue by keeping track of the state for each session window such that duplicate primitives do not trigger duplicate events.

In general, no one single primitive occurring typically may be sufficient to generate an event. Further, a prescribed number or select combination of multiple observed actions, e.g., multiple primitives, typically will be used to provide the requisite proof to generate an event, e.g., increasing the reliability of the system 10A/10B, reducing false detections/events, etc. . . . . With embodiments of the present disclosure, the compromise detector 50 will create events based on one or more threshold criteria. The system 10A/10B can be set to require any one or combination of threshold criteria for creating an event.

For example, the compromise detector 50 can generate an event(s) if a particular entity exceeded a prescribed number "N" of primitives observed. That is, if the session window includes the prescribed number N of primitives or more, the compromise detector 50 will create an event. The number N generally is selectable/configurable by clients, MSSPs, etc. and can be set to any appropriate number, e.g., two, three, four, five, six or more and so on.

The compromise detector 50 also can generate an event(s) when specific combinations or sequences are observed (e.g., any one signature primitive and any one improbable primitive are observed within a session window or other combinations of primitives that are representative of attack patterns or suspicious activity). In this regard, the compromise detector 50 will create an event if/when a session window includes a particular combination and/or sequence of primitives that matches a stored combination and/or sequence of primitives known to represent or related to attack patterns or suspicious activity.

In addition, the compromise detector 50 further can generate an event if a signature or sequence of primitives is likely to represent an attack pattern or suspicious activity according to a prescribed probability threshold or confidence internal, e.g., the compromise detector 50 determines a 90% or more likelihood that a particular combination or sequence of primitives in a session window represents an attack pattern or suspicious activity. The prescribed probability can be selectable and set to any value, e.g., 80%, 85%, 95%, 99%, etc., Further, in some implementations, the compromise detector 50 can generate an event if a signature or sequence of primitives in a session window is not likely to represent safe or benign activity according to a prescribed probability threshold or confidence internal, e.g., the compromise detector 50 determines a 10% or less likelihood that the signature or sequence of signatures is safe or benign. This prescribed probability also can be selectable and set to any value, e.g., 20%, 15%, 5%, 1%, etc.

Returning to FIGS. 1-2, the system 10A/10B further can include a client portal 60 that can be accessed by the clients 12. The events 52 created by the compromise detector 50 are delivered to the client portal 60 to be accessed the respective client responsible for the suspected compromised entity, and clients 12 can investigate an event internally, as well as explore the entity's history through a graphical visualization of the compromised entity's historical behavior. In this regard, when an event is created, the compromise detector 50 or other components of the system 10A/10B can provide data or information related to the event, such as details providing context to the event, including, but not limited to, an aggregation of the original timestamps, event IDs for manual investigation, or other event details sufficient for the client to initiate an investigation and attempt to recover the compromised entity.

The client portal 60 also can provide one or more displays or visualizations, e.g., a series of dynamic visualizations, relating to the event so that the client can also visually explore the historical behavior of the entity in the client portal. Entity data generally is fetched in real-time during exploration from the entity and client profile databases. The visualization can help the client efficiently determine whether the entity's behavior should be investigated or how it should be remediated by providing a clearer explanation as to why the event was created. Accordingly, the system 10A/10B provides an improvement to and goes beyond the systems and methods employing a traditional "black box" strategy of providing clients with events, without sufficient context as to why the event is abnormal.

FIG. 2 further indicates that the system 10B includes a client feedback database 70 that collects or stores information related to client feedback on the events, and a supervised machine learning model 72, such as one or more neural networks, linear regression models, support vector machines (SVMs), other trained machine learning models, etc., that is trained on this client feedback information in order to determine whether future compromise events are useful to particular clients. For example, clients can provide binary feedback, e.g., yes—useful or no—not useful, as to whether a particular compromise event 52 was useful by making a selection in the client portal 60, e.g., by selecting a radio button, when resolving an event. Information related to the feedback then is stored in the client feedback data base 70 as a binary label where the primitive types in the event, as well as the client and entity information, are used as input features for the supervised machine learning model 72. The supervised machine learning model 72 can train on this data in order to provide a probability of "usefulness" for subsequently generated events. In this regard, output from the supervised machine learning model 72 can be provided to the compromise detector 50 to suppress events below a certain usefulness threshold, e.g., based on a prescribed level of probability or confidence internal that a particular client will find the compromise event useful. The system 10B also can assign a "priority" score to compromise events based on outputs from the supervised machine learning model 72, such that clients can investigate or attempt to remediate events in the appropriate order, e.g., based on this priority score to address high priority events before low priority events. Thus, the system 10B can be passively tuned, with minimal human intervention, through client feedback on reported compromise events.

FIG. 2 further shows that client information can be provide from the client portal 60 to the entity profile data base 26 and/or the client profile database. For example, the client information can provide system tuning, e.g., to update the system to add or prioritize primitives that are most relevant to a particular client.

Figure 4A:
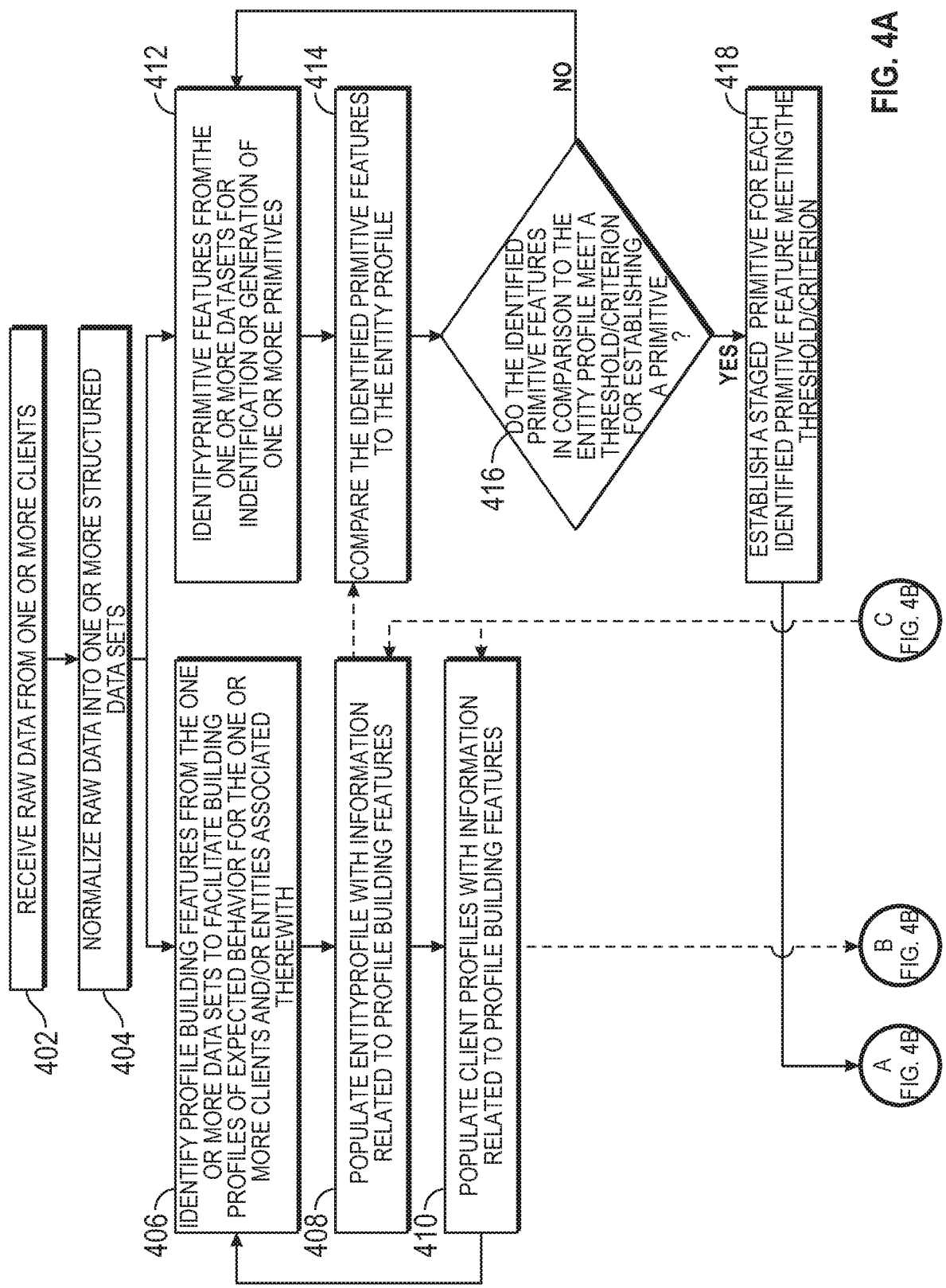
FIGS. 4A and 4B are flow charts illustrating a process or method for identifying attack patterns or suspicious activity according to principles of the present disclosure.
Figure 4B:
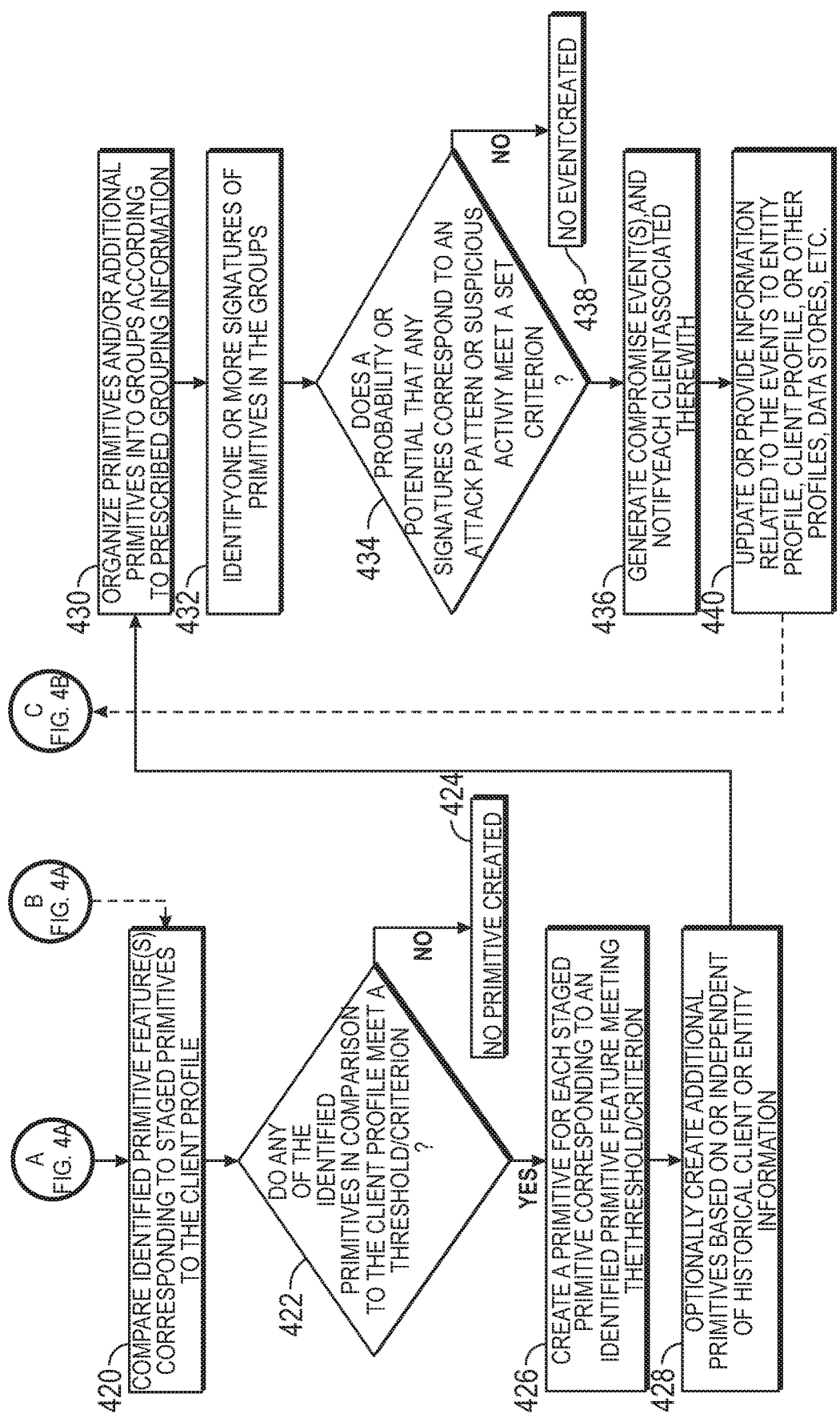

FIGS. 4A and 4B show a schematic diagram of a method or process for identification of attack patterns or suspicious activities in one or more data sets received from a plurality of clients. At 402, raw data is received from one or more clients, and the raw data is normalized into one or more structured data sets (at 404). For example, the raw data can include unstructured logs that are normalized into structured logs having a prescribed schema.

As indicated in FIG. 4A, at 406, profile building features are identified from the one or more data sets to facilitate building profiles of expected behavior for the one or more clients and/or entities associated with the one or more clients. In particular, at 408, an entity profile can be populated with information related to the extracted profile building features, such as feature frequency information for a particular entity or entities. Also, at 410, a client profile can be populated with information related to the extracted profile building features, e.g., information related to a count or number of entities associated with a particular client or clients.

At 412, primitive features can be identified from the one or more data sets to facilitate identification or generation of one or more primitives. Thereafter, at 414, the identified primitive features can be compared to information in entity profiles, and a determination whether the identified permanent features meet a threshold or criterion for establishing a primitive in comparison to the entity profile is made at 416. If the threshold or criterion is met, a staged primitive is established for each identified primitive feature meeting the threshold or criterion at 418. If the identified primitive features do not meet the threshold or criterion, no primitives are staged and the process can return to 412.

Subsequently, as indicated in FIG. 4B, identified primitive features corresponding to the staged primitives are compared to information in the client profile at 420. At 422, a determination is made as to whether any of the identified primitives in comparison to the client profile meet a threshold or criterion. Primitives are not created for primitive features relating to staged primitives that do not meet this threshold or criterion as indicated at 424. However, if the threshold or criterion is met, a primitive is created for each staged primitive corresponding to an identified primitive feature meeting the threshold or criterion, as indicated at 426.

Optionally, as indicated at 428, additional primitives can be created based on or independent of historical client or entity information. For example, IOC primitives, business email compromise primitives, cloud account hijacking primitives, or other suitable primitives can be created at 428.

Thereafter, at 430, primitives and/or additional primitives can be organized into groups according to prescribed grouping information, e.g., primitives can be grouped in session windows based on entity information, client information, time-based information, etc. And, at 432, one or more signatures, e.g., specific combinations or sequences, of primitives can be identified from/in the groups. Then, at 434, a determination is made as to whether there is a probability or potential that any of the signatures correspond to an attack pattern or suspicious activity (e.g., if one or more combinations or sequences of primitives meet a prescribed criterion, such as the received primitives in one of the session windows includes a number of primitives that exceed a prescribed number, match a specific combination or sequence of primitives that relate to known attack patterns or suspicious activities, are likely to correspond to one or more attack patterns or suspicious activities according to a prescribed probability threshold, or combinations thereof).

If there is there is a probability or potential that any of the signatures correspond to an attack pattern or suspicious activity as determined at 434, a compromise event(s) is generated and each client associated with the event(s) is notified and provided detailed information related to the event at 436. If not, no event is created (as generally indicated at 438).

Furthermore, at 440, information related to the compromise event(s) can be updated or can be provided to the entity profile, the client profile, or other profiles or data stores, etc. of the system, e.g., to provide tuning or update the system to help with the creation of primitives or identification of subsequent compromise events.

For purposes of this disclosure, an information handling system 80 (FIG. 5) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, a touchscreen and/or a video display. The information handling system also may include one or more buses operable to transmit communications between the various hardware components.

As shown in FIG. 5, in some embodiments, the clients 12 can manage or otherwise include one or more networked system 82 of information handling systems/devices 80 or other communicable systems/devices. A network 84 may provide data communications among the information handling systems/devices 80, which can include workstations, personal computers, smart cellular telephones, personal digital assistants, laptop computers, servers, and other suitable devices. The network 84 can include a private or public network, such as a local area network, or other suitable network(s), such as the Internet or another wide area network, virtual personal network, peer to peer filing sharing system, and/or other suitable communication lines, or combinations thereof. FIG. 5 also indicates that the linked or networked information handling systems 80 may include one or more monitoring devices 86 communicatively coupled to the network 84. The monitoring device(s) 86 can be managed by an MSSP.

In one embodiment, the monitoring device(s) 86 may include a server or sequence analyzer or other client suitable computing device that has a processor and a memory or other suitable storage. The memory can include a random access memory (RAM), read only memory (ROM), and/or other non-transitory computer readable medium. The monitoring device(s) 86 further typically will be operable to store and execute computer readable instructions to continuously monitor, in real-time, activity at each networked system, for example, activity of the information handling systems 80 connected to network 84. The monitoring device(s) 86 can ingest or aggregate information or data logs related to activities of the information handling systems 80 and can provide these ingested/aggregate data logs or information or data related thereto to by the system 10A/10B for processing thereby. In addition, or in the alternative, the system 10A/10B can include a data center 88, such as a data center 88 management by an MSSP, with a plurality of networked information handling systems 80, e.g., including one or more servers 90 with at least one memory 92 and one or more processors 94 for receiving information or data logs related to activities of the information handling systems 80 of system 82. These information/data logs can be a part of the raw logs 14 provided to the system 10A/10B.

One or more components of the system 10A/10B can be resident on or accessed by the devices 80, the server(s) 90, or other devices or information handling systems in communication therewith. One or more processors of the device 80 of the one or more processors 94 can process or execute instructions, workflows, etc., stored in at least one memory (e.g., a memory of the devices 90 or memory 92) to facilitate performance of various processes, functions, etc. of the system 10A/10B.

The foregoing description generally illustrates and describes various embodiments of the present disclosure. It will, however, be understood by those skilled in the art that various changes and modifications can be made to the above-discussed construction of the present disclosure without departing from the spirit and scope of the disclosure as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present disclosure. Accordingly, various features and characteristics of the present disclosure as discussed herein may be selectively interchanged and applied to other illustrated and non-illustrated embodiments of the disclosure, and numerous variations, modifications, and additions further can be made thereto without departing from the spirit and scope of the present invention as set forth in the appended claims.

What is claimed is:

1. A system for identifying attack patterns or suspicious activity in computer networks relating to a plurality of clients, comprising:
   a memory;
   a normalizer configured to receive raw data from the computer networks and normalize the raw data into one or more structured data sets;
   a profile builder that builds one or more baseline activity profiles for each client of the plurality of clients or entities associated therewith using the one or more structured data sets;
   at least one primitive creator configured to generate primitives that are possibly indicative or suggestive of attack patterns or suspicious activity in the computer networks, wherein the at least one primitive creator extracts features from the one or more structured data sets, and create one or more primitives for each extracted feature that are found to occur below one or more selected frequency thresholds based on information in the one or more baseline activity profiles, each of the one or more selected frequency thresholds corresponding to one or more of the plurality of clients or entities; and a compromise detector that receives primitives from the at least one primitive creator, wherein the compromise detector organizes the received primitives into groups according to prescribed grouping information and identifies combinations or sequences of primitives in the groups, and for each identified combination or sequence of primitives that meets one or more selected criteria, the compromise detector generates a compromise event to be provided to affected clients;

wherein, in response to a determination that the primitives received from the at least one primitive creator includes a number of primitives that exceed a prescribed number, match a specific combination or sequence of primitives that relate to known attack patterns or suspicious activities, are likely to correspond to one or more attack patterns or suspicious activities according to a prescribed probability, or combinations thereof, the compromise detector generates the compromise event.

2. The system of claim 1, wherein the profile builder populates entity profiles for each entity associated with the clients with historical information related to the extracted features, and the profile builder populates the client profiles for each of the clients with historical information related to the extracted features.

3. The system of claim 2, wherein the at least one primitive creator compares the extracted features to the historical information in a corresponding entity profile, and if the extracted features in comparison to the historical information in the entity profile meet a prescribed entity frequency threshold, the at least one primitive creator establishes a staged primitive to be investigated further for each identified primitive feature meeting the prescribed entity frequency threshold, and wherein the at least one primitive creator further compares the extracted features corresponding to each staged primitive to the historical information in a corresponding client profile, and if the identified primitives features corresponding to a staged primitive in comparison to the historical information in the client profile meet a prescribed client frequency threshold, the at least one primitive creator creates a corresponding primitive to be provided to the compromise detector.

4. The system of claim 1, further comprising at least one additional primitive creator that creates primitives independent of historical client or entity information.

5. The system of claim 4, wherein the at least one additional primitive creator includes an indicator of compromise primitive creator, a business email compromise primitive creator, a cloud account hijacking primitive creator, or combinations thereof.

6. The system of claim 1, wherein the compromise detector groups the primitives received from the at least one primitive creator in session windows that are open for a prescribed time period.

7. The system of claim 1, further comprising a client value machine learning system that receives client feedback information as one or more inputs, and generates one or more outputs that are provided to the compromise detector to facilitate suppression of compromise events below a certain probability threshold.

8. The system of claim 1, wherein the raw data includes unstructured logs aggregated from the computer networks and wherein the normalizer normalizes the unstructured logs into the structured data sets, each having a prescribed schema.

9. A method for identifying attack patterns or suspicious activity in computer networks relating to a plurality of clients, comprising:

receiving data from the computer networks;

building one or more baseline activity profiles for each client of the plurality of clients or entities associated therewith;

extracting features from the received data for comparison with information in the one or more baseline activity profiles, creating primitives that are possibly indicative or suggestive of attack patterns or suspicious activity in the computer networks for features that occur below a plurality of selected frequency thresholds based on information in the one or more baseline activity profiles, wherein each of the plurality of selected frequency thresholds correspond to one or more of the plurality of clients or entities;

organizing the primitives into groups according to prescribed grouping information, identifying combinations or sequences of primitives in the groups;

in response to a determination that an identified combination or sequence of primitives includes a number of primitives that exceed a prescribed number, match a specific combination or sequence of primitives that relate to known attack patterns or suspicious activities, are likely to correspond to one or more attack patterns or suspicious activities according to a prescribed probability, or combinations thereof, generating an event; and notifying affected clients of each generated event to indicate an identified attack pattern or suspicious activity and facilitate investigation or remediation thereof.

10. The method of claim 9, further comprising:

populating entity profiles for each entity associated with the clients with information related to the extracted features, and populating client profiles for each of the clients with information related to the extracted features.

11. The method of claim 10, further comprising:

comparing the extracted features to historical information in a corresponding entity profile;

establishing a staged primitive to be investigated further for each extracted feature meeting a prescribed entity frequency threshold in comparison to the historical information in the entity profile;

comparing the extracted features corresponding to each staged primitive to the historical information in a corresponding client profile; and creating a corresponding primitive for each extracted feature corresponding to a staged primitive that meets a prescribed client frequency threshold in comparison to the historical information in the corresponding client profile.

12. The method of claim 10, further comprising creating additional primitives independent of historical client or entity information.

13. The method of claim 10, further comprising grouping the received primitives into session windows.

14. The method of claim 13, further comprising generating events if the received primitives in the session windows include a number of primitives that exceed a prescribed number, match a specific combination or sequence of primitives that relate to known attack patterns or suspicious activities, or are likely to correspond to one or more attack patterns or suspicious activities according to a prescribed probability.

15. The method of claim 10, further comprising:
aggregating unstructured logs from networks managed by the plurality of clients, and
normalizing the unstructured logs into normalized logs having a prescribed schema.

16. A system for identifying attack patterns or suspicious activity on computer networks related to a plurality of clients, comprising:
one or more processors and at least one memory having stored therein instructions that when executed by the one or more processors, cause the system to:
receive data from the computer networks;
build one or more baseline activity profiles for each client of the plurality of clients or entities associated therewith;
extract features from the data received from the computer networks for comparison with information in the one or more baseline activity profiles;
create primitives that are possibly indicative or suggestive of attack patterns or suspicious activity in the computer networks for features that occur below each of a plurality selected frequency thresholds based on information in the one or more baseline activity profiles, each of the plurality of selected frequency thresholds corresponding to one or more of the plurality of clients or entities;
organize the primitives into groups according to prescribed grouping information, identifying combinations or sequences of primitives in the groups;
in response to a determination that an identified combination or sequence of primitives includes a number of primitives that exceed a prescribed number, match a specific combination or sequence of primitives that relate to known attack patterns or suspicious activities, are likely to correspond to one or more attack patterns or suspicious activities according to a prescribed probability, or combinations thereof, generating an event; and
notify affected clients of each generated event indicating an identified attack pattern or suspicious activity and facilitate investigation or remediation thereof.

* * * * *